United States Patent
Hunter et al.

(10) Patent No.: US 7,017,783 B1
(45) Date of Patent: Mar. 28, 2006

(54) DISPENSING PACK AND MACHINE

(75) Inventors: Jeffrey Hunter, Rome (IT); Janume Oliveras Pico, Gloucester (GB)

(73) Assignee: Good Humor - Breyers Ice Cream, a Division of Conopco, Inc., Green Bay, WI (US)

( * ) Notice: Subject to any disclaimer, the term of this patent is extended or adjusted under 35 U.S.C. 154(b) by 433 days.

(21) Appl. No.: 10/088,436

(22) PCT Filed: Sep. 7, 2000

(86) PCT No.: PCT/EP00/08730

§ 371 (c)(1), (2), (4) Date: Jul. 8, 2002

(87) PCT Pub. No.: WO01/19205

PCT Pub. Date: Mar. 22, 2001

(30) Foreign Application Priority Data

Sep. 13, 1999 (ES) ................. 9902028

(51) Int. Cl.
*B65D 88/54* (2006.01)

(52) U.S. Cl. .................. 222/327; 222/146.6

(58) Field of Classification Search ........... 222/386, 222/327, 146.6
See application file for complete search history.

(56) References Cited

U.S. PATENT DOCUMENTS

| 1,494,982 A |   | 5/1924 | Sides |
|---|---|---|---|
| 2,889,949 A |   | 6/1959 | Nirenberg |
| 3,752,364 A | * | 8/1973 | De Vries ........ 222/131 |
| 3,884,396 A |   | 5/1975 | Gordon et al. |
| 5,020,698 A | * | 6/1991 | Crossley ........ 222/386 |
| 5,375,740 A |   | 12/1994 | Umetsu et al. |
| 5,820,892 A |   | 10/1998 | Lauer et al. |
| 5,918,767 A |   | 7/1999 | McGill |
| 5,967,381 A | * | 10/1999 | van Zeeland et al. ....... 222/327 |
| 6,732,771 B1 |   | 5/2004 | Gispert-Casino et al. |

FOREIGN PATENT DOCUMENTS

| AU | 89435/98 | 3/1999 |
|---|---|---|
| CH | 553106 | 8/1974 |
| DE | 297 12 273 | 12/1998 |
| EP | 821 880 | 2/1998 |
| EP | 919 134 | 6/1999 |
| EP | 0 995 685 A1 | 4/2000 |
| GB | 23 42 957 | 4/2000 |

(Continued)

OTHER PUBLICATIONS

German Search Report dated Nov. 26, 2003.

(Continued)

*Primary Examiner*—Philippe Derakshani
(74) *Attorney, Agent, or Firm*—Gerard J. McGowan, Jr.

(57) ABSTRACT

An ice-cream container pack that forms a replaceable cartridge in an associated dispensing machine, said pack comprising a cylindrical body fitted with a nozzle and a plunger which, when operated by the piston of said machine, dispenses the ice cream from the pack via said nozzle, said pack being characterized in that the bottom edge (8) of the cylindrical body wall (1) is directly attached to the end wall (5), said end wall being in the form of a truncated cone, the smaller and free base of which houses the extrusion nozzle (7), whereby a part of the end wall (5) constitutes the support base for the pack on the support (4') with which said dispensing machine is provided.

14 Claims, 2 Drawing Sheets

FOREIGN PATENT DOCUMENTS

| | | |
|---|---|---|
| WO | 94/13154 | 6/1994 |
| WO | 96/33928 | 10/1996 |
| WO | 97/34807 | 9/1997 |
| WO | 98/58551 | 12/1998 |

OTHER PUBLICATIONS

Spanish Search Report dated Jan. 28, 2002.

* cited by examiner

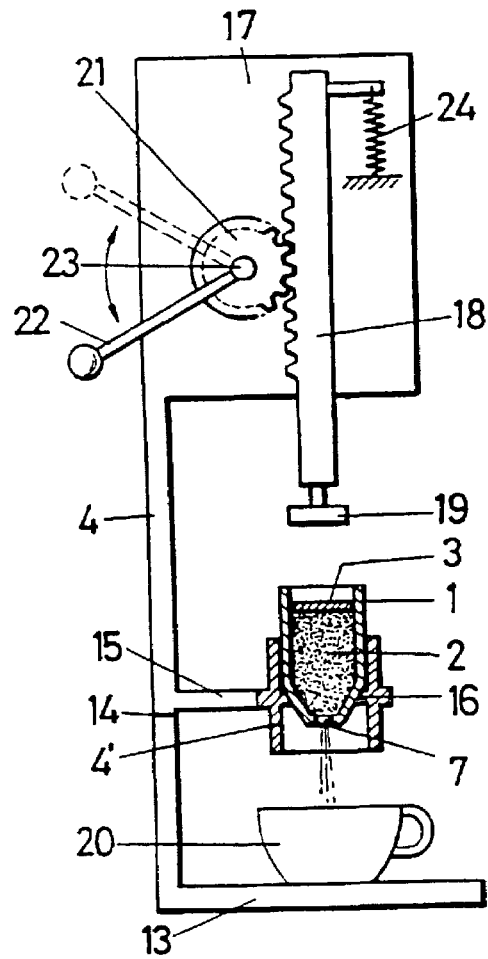
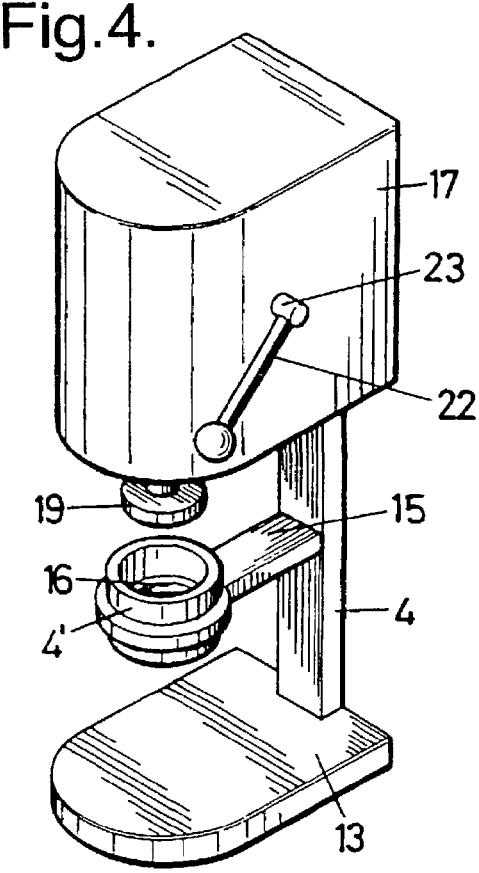
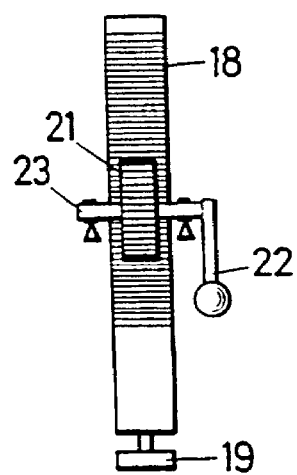

DISPENSING PACK AND MACHINE

SUBJECT OF THE INVENTION

The present invention lies in the sphere of container packs for edible ice-cream products and, more specifically, that of disposable and preferably single-serving packs designed so that the product they contain is dispensed by extrusion.

When ice-cream is dispensed from a pack of this type, the shape of the extruded product is determined primarily by the form of the nozzle through which it passes. The primary objective of the present invention is to ensure that the product is extruded in optimal condition ensuring, in particular, that disfigurement of the extruded product, as a result either of accumulation of product around the nozzle on the outside of the pack, or of deformation of the nozzle during extrusion, is minimised.

An additional advantage of the design of this pack is that it helps to keep the dispensing nozzle itself clean, together with the pack in general, so that said pack is able to comply with the most stringent standards of hygiene.

Extrusion of the ice cream from the pack is most conveniently achieved with the aid of a machine and a further aspect of the present invention is accordingly the design of a machine to complement the novel pack design in achieving the improved quality of the dispensed product. It is anticipated that such machines will prove particularly well suited for dispensing ice-cream, from individual packs according to the invention into receptacles such as plates or cups or any other such suitable container more attractive for consumption of the product, at ice-cream distribution stalls, cafes, restaurants, etc.

PRIOR ART

In the field of edible ice-cream, the technique of serving by extrusion from a suitable pack has long been known.

Two basic versions of the extrusion system are well-known; one where the ice-cream is served at the time of use by the consumer itself, and the other where a machine is used to serve the ice-cream product to said consumer.

Systems of the former type generally comprise tubular, cylindrical packs, generally constructed of plastic-coated cardboard, housing a plunger, which is also cylindrical, extending axially into an operating rod and sealed at the other end with a cap so that, while the product remains in storage, it is completely protected inside the pack by said cap and by the plunger itself. For consumption, the cap is removed and the user gradually presses on the operating rod to push the ice-cream product out, also gradually, through the opening in the pack left by the cap.

Machines designed primarily for dispensing multiple servings of edible ice-cream by extrusion are also well-known. Such machines are generally equipped with a cylinder, which may be filled with a considerable amount of ice-cream, and an extrusion nozzle. The plunger fitted to said cylinder is used, in a design similar to a standard "churrera" or doughnut-maker, to push the product out, extruded through said nozzle, and place it in any type of recipient for consumption.

More recently, machines without said cylinder have been used, which are fitted just with an operating plunger and die. These are designed to be used together with "cartridges" which can hold a suitable volume of ice-cream and are provided with a plunger which, on introduction into the machine, forms an addition to its piston. These cartridges have a twin function, on the one hand as a suitably sealed pack for transportation of the ice-cream product in optimal conditions of hygiene from its place of manufacture to the distribution points where the associated machines are installed and, on the other, as a cylinder on the dispensing machine itself, so that no further handling is required at those points beyond the replacement of a used cartridge with a new one following dispensing of the ice cream.

Packs of this "cartridge" type consist of a cylindrical body, one of the outlets of which is intended to act as a circumference seat on the associated support of the extruding machine. During storage and transportation of the pack, this end of the cylinder needs to be sealed, usually by means of a fine disc appropriately affixed to the aforesaid outlet, for instance by heat-welding. The other end of the cylindrical body is sealed by the plunger itself, which will be operated by the machine as the product is served.

Conventionally in a pack of this type, the extrusion nozzle is located at the end of a truncated cone structure which converges towards the bottom end of the cylinder, for preference on the geometric axis of the pack. The extrusion hole itself may have one of any number of shapes—star, polygon, etc. Since this truncated cone structure is not sealed off from the ice-cream product during storage and transportation, it must be contained within the cap that seals the end of the pack prior to dispensing. It therefore has to be recessed with respect to the bottom end of the outer cylindrical wall of the pack, and a space is consequently left between the inner truncated cone wall, the sealing cap and the cylindrical side wall.

In practice, packs of this type present problems basically centred around two aspects. Firstly, in the course of pack handling operations, for instance filling on the production line and transportation of the packs, part of the ice-cream product often flows through the extrusion opening into the space between the inner cone wall surrounding the nozzle, the side wall of the cylindrical body and the sealing cap. When the ice-cream is served, material accumulated in this space may be dispensed along with newly extruded product which is disadvantageous because it causes the end product to lose a substantial part of the shape formed by said nozzle, so that a serving of the product differs considerably in appearance from that intended.

Secondly, since the whole pack rests on the support around the circumference of its tubular body, there is no direct support of the inner truncated-cone wall around the nozzle during extrusion. Consequently the cone structure is liable to be forced out of shape by the actual extrusion pressure. This in turn affects the shape of the served product, further contributing to making said shape substantially different from that intended.

DESCRIPTION OF THE INVENTION

The present invention comprises a novel design of pack from which ice cream may be dispensed by extrusion, together with a machine to effect the dispensing. The improvements represented by the invention offer a satisfactory solution to the problems referred to above.

The pack of the present invention incorporates a cylindrical body, designed to contain a suitable volume of ice-cream and sealed at one end by an extrusion plunger in the normal way. It is distinguished from the prior art, however, by the key innovation that the other end wall, in which the extrusion nozzle is located, is attached directly to the bottom edge of said cylindrical body, rather than being recessed with respect to this edge, as is normally the case. This allows the sealing cap to be situated directly on the end wall where the nozzle is located, so that there is no possibility of any product emerging through the nozzle during storage and handling of the pack, until the time when it is opened. Thus when the ice cream is served, all the dispensed material will be newly extruded from the nozzle and will therefore have improved retention of the shape conferred by the nozzle aperture, in comparison to product dispensed from previously known packs.

In addition, the pack design allows the dispensing machine to support the pack directly on its end wall, rather than just at the circumference, on the side walls, as is conventionally the case. Specifically, the end wall is in the form of a truncated cone, the smaller and free base of which houses the extrusion nozzle, and the machine is provided with a support having an angled surface designed to be complementary to this truncated cone structure. This provides important beneficial effects in the serving of the product. First, any deformation of the aforesaid truncated cone wall during extrusion is minimised, resulting in better control of the shape of the extruded product. Second, and especially if said support surface is warmed, it produces a slight and beneficial increase in the temperature of the bottom area of the pack, thus enabling the product to flow more readily towards the extrusion nozzle, so that dispensing is possible with less pressure on the plunger, thereby further reducing the risk of deformation in the walls surrounding said extrusion nozzle.

Said localised warming is designed not to affect significantly either the walls of the pack away from the immediate vicinity of the extrusion nozzle or the ice-cream contained within, so that there is no deleterious effect on the quality of the dispensed ice-cream but, on the other hand, it does have the additional advantage of making the surface of the extruded product very smooth, thus further enhancing its appearance.

The body of the pack is in the form of a cylinder, the cross section of which may be circular, oval, polygonal or any other shape, with the only restriction being that said cross-section must be constant along the length of the cylinder, so that when the ice-cream is dispensed the sliding plunger cap remains in close contact with the walls of the pack as it is driven down towards the base, thereby expelling the ice cream effectively through the nozzle. The pack may optionally be fitted with an outer rim at the top end to facilitate holding of the pack in place for filling on an automated production line.

The pack and seal may be made of cardboard, plastic or any other material suitable for use with food. Suitable plastic materials would include polyethylene (PE), polystyrene (PS) and polypropylene (PP). The walls of the body of the pack should be thick enough to ensure that the structure remains rigid during handling and product dispensing. In one practical embodiment, use was made of an injected polypropylene (PP) pack with side walls an average of 0.7 mm thick, and a base of 0.5 mm. When the pack and/or seal is made of card, it is practical to coat the inside with a sealable plastic layer (with polythene being particularly suitable for this purpose).

The capacity of the pack may, albeit without limitation, suitably be between 100 and 160 ml, especially 120 ml, for a single product serving.

The ice content of the ice-cream affects its firmness and hence the ease with which the product can be extruded. Suitably, the ice content may be in the range between 29% at −7° C. and 42% at −12° C.

The serving temperature of the ice-cream should preferably be between −8° C. and −12° C., although in practice it may go above or below these values.

In order to be suitable for serving and consumption, the ice-cream should preferably have a dissolved air content of between 60 and 120% of its total volume; a typical figure would be 70% of the total ice-cream volume.

The nozzle aperture may measure approximately 24–28 mm across, with an area of 200–400 mm2, depending on the shape of said aperture. This shape is important in facilitating the extrusion of the product; for instance, if the opening means that there is a large area of contact of the extruded ice-cream with the surrounding air, this will raise the ice-cream temperature, making it easier to serve. A star-shaped aperture is particularly effective and creates an attractive extrudate shape but the points of the star should not be too small, otherwise they will be prone to blocking with particulates which, in turn, could increase the shear on the ice-cream during extrusion, leading to damage to its bulk properties.

The extrusion dispensing of the ice-cream contained in the pack described uses a machine which forms part of the invention as such and which is structured around a frame intended either for wall mounting or standing on a counter. In either case said frame includes a built-in lower mount to install and attach the ice-cream container pack, completed at the top with a housing containing a rack which has a ram at the base and which is positioned vertically, specifically aligned with the pack holder housing. In operation, as the rack descends the ram engages the plunger which is integral to the ice-cream pack, forcing it downwards within the cylinder of the pack and hence extruding the ice-cream through the nozzle located at the base. The force required to extrude this ice-cream product ranges from 60–170 Newtons under the conditions described above.

The upper housing suitably also contains a ring gear which meshes with the aforesaid rack and which is secured to an operating lever to enable the downward movement of the ram, against the tension of a return spring, as the pack is emptied, with a suitable receptacle for collecting the ice-cream in place beneath the nozzle outlet.

The aforementioned pack holder may be fixed, when the machine is intended specifically for packs of a given type, but may be adjustable where it is planned to use packs of different sizes, for one or more ice-cream servings, in the sense that the length of the ram stroke in said pack may be varied to maintain compatibility with packs of different axial dimensions.

The aforementioned holder is terminated, at the end opposite to where it is attached to the frame, in a bushing of a shape and size suitable to admit and hold the pack inside it, while preventing said pack from swaying sideways. Said bushing is fitted with a lower stop to stabilise said pack in the emptying position and mounts to provide support to the walls of the pack in the region surrounding the nozzle, as discussed above.

It will be appreciated that although the invention is described herein primarily with reference to its use in dispensing ice-cream, it is equally applicable for use in dispensing other frozen confections such as frozen water ices, frozen yoghurts, frozen custards, sorbets and the like. Reference to ice-cream will accordingly to refer also to such other frozen confections unless otherwise indicated.

DESCRIPTION OF THE DRAWINGS

To supplement this description and to contribute to a better understanding of the features of the invention in a preferred embodiment, a set of drawings is accompanied forming an integral part hereof and which, by way of illustration and without limitation, show the following:

FIG. 4 shows a perspective view of a machine for extruding ice-cream from disposable packs, produced in accordance with the object of the present invention.

FIG. 5 shows a side elevation and cross-section view of the same machine.

FIG. 6 lastly shows a profile view of the coupling between the rack and the ring gear operating it.

A PREFERRED EMBODIMENT OF THE INVENTION

Figure 1:
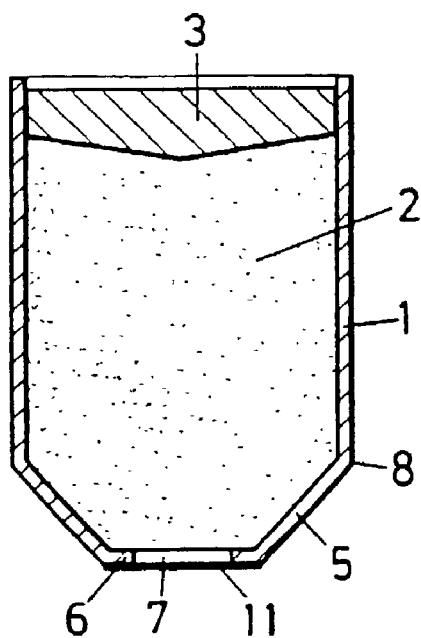
FIG. 1 shows a diagrammatic side elevation and diametric cross-section of a container pack for ice-cream dispensed by extrusion, designed according to the improvements which are the subject of the present invention.
Figure 2:
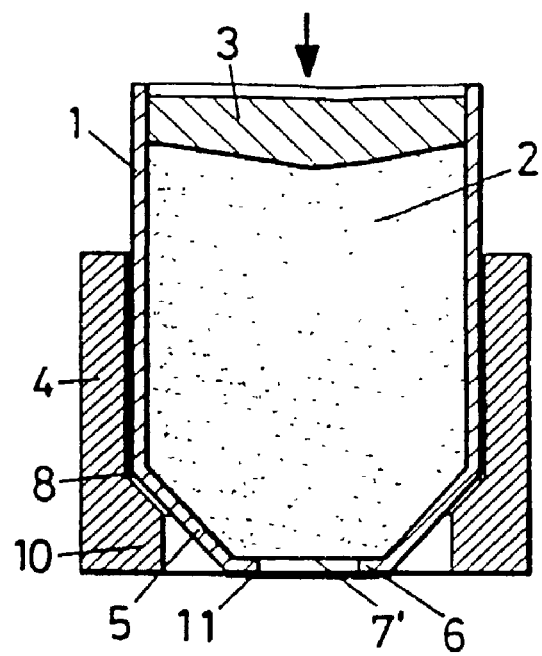
FIG. 2 is similar to FIG. 1, showing the same pack, duly coupled to the extruding machine support.

These figures illustrate the structure of a pack produced according to the invention. The pack has a cylindrical body (1) of capacity suitable for the mass of ice-cream (2) it is to contain. At one end of said body (1), there is a plunger cap (3) which, besides being one of the elements for sealing the pack during its storage and handling from the place of packing to the time of its consumption, is designed to receive the action of the piston of the machine (4) when it is required to serve the product (2).

Figure 3:
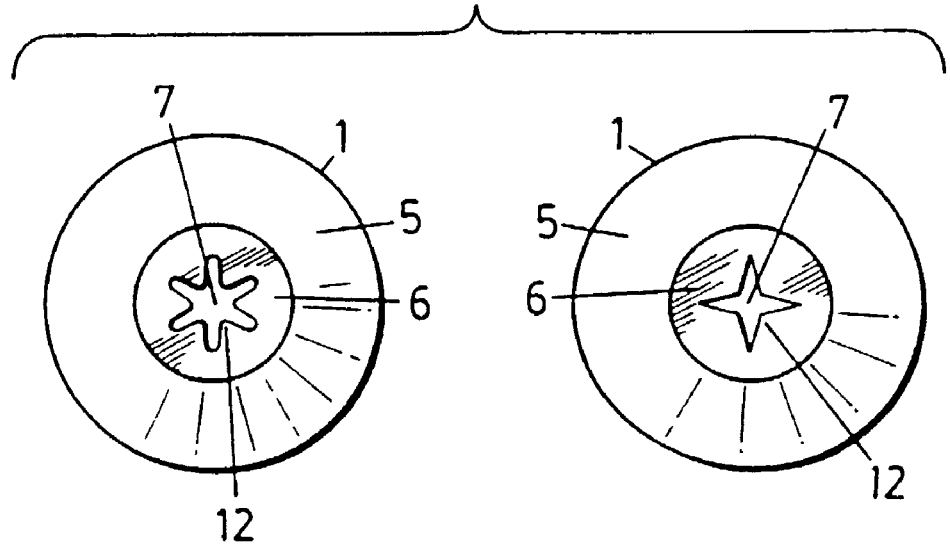
FIG. 3 is a bottom axial view of the same pack as in FIG. 1, showing two of the numerous possible configurations for the extrusion nozzle.

At the other end, the body (1) of the pack is sealed by means of a wall (5), of a truncated cone shape, the smaller and free base (6) of which houses the nozzle or extrusion opening (7) which may adopt one of the rounded vertex star forms in FIG. 3 or any other which may be deemed fit, such as square, rectangular, triangular, oval, etc. When the pack is in place in the dispensing machine, the end wall (5) is in contact with the support (4') with which the machine is provided. The principle of operation is then that a downward motion of the piston of the machine (4) drives the sliding cap of the pack (3) downward in turn, thereby forcing extrusion of the ice-cream through the nozzle (7) and into a suitable receptacle.

The focus of the distinguishing features of the pack produced according to the improvements of this invention is that the aforesaid end wall (5) is connected directly to the lower end or outlet (8) of the tubular body (1) so that, with the assistance of internal radial mounts (10) fitted on the support (4') and angled according to the generatrix of the truncated cone sector (5), the pack can be supported as a whole on said support (4'), not only by way of the bottom outside edge of the actual body (1), but also by means of this shortened cone wall (5) thereby ensuring that it will not be deformed by the pressure generated by the machine piston (4).

As a complement to the structure described, the pack is closed and sealed until its contents are to be consumed, with the aid of a thin disc (11) which matches the smaller base (6) of the shortened cone partition (5) in shape and size, in other words solely and directly affecting the extrusion nozzle (7) so that, until the time when the contents (2) of the pack start to be consumed said contents are kept absolutely in position in the chamber of the pack.

It is also foreseen that the overhanging portions (12) on the base (6) of the partition (5) forming the nozzle (7) (i.e. those portions not directly supported by the support (4')) are designed and of dimensions to guarantee that they will bend minimally under the pressure of the machine ram on the cap or plunger (3) in order, in turn, to minimise any deformation of the cross-section of the extruded product. A feature that further aids in the achievement of this objective is the thermal contact between the truncated cone structure of the partition (5) and the radial mounts (10) of the support (4') which, with the warming of said support (4') and more specifically of said mounts (10), permits a slight rise in the temperature of the product (2) in the vicinity of the wall (5), enabling the ice-cream product (2) to slide more readily towards the nozzle (7) therefore allowing it to emerge from the machine with lower pressure on the plunger cap (3). Said warming must not affect the main body of the pack or the ice-cream contained within, as this could damage its eating quality.

The machine (4) for extrusion dispensing of the ice-cream or product (2) contained in the pack (1) described is designed around a frame comprising a stand or base (13) to support the machine as a whole on a counter top, although this stand (13) is linked to the frame (4) by way of a removable coupling (14) so that said stand may be used only when necessary and can be removed when, for instance, the machine (4) is mounted on a wall.

At the bottom of the frame and here located above the stand or base (13), the frame has a pack holder (15) which terminates in a bushing which forms the aforementioned support (4'), and this vertical axis bushing or support (4') is of suitable size and shape to contain the pack (1) containing product (2) in a stable position, defined by an inner perimeter stop (16) on the support (4') and by a perfect side fit between the pack and support, as shown particularly in FIG. 4.

To complement the structure described, the frame terminates at its upper end in a housing (17) containing a vertical rack (18), specifically set coaxially to the support (4') and to the pack (1). Said rack terminates at the bottom with a ram (19) of suitable size and shape to enter the pack (1), acting on the moving cap or plunger (3) of the pack (1) as a pusher extruding the ice-cream (2) towards the bottom opening or nozzle (7) of the aforesaid pack (1) so that it emerges and drops under the force of gravity into any receptacle (20) placed below.

In practice, the pack (1) and the support (4') may be configured in the manner shown in the figures or in any other way that ensures that the pack (1) is completely stable in the holder (15) and that the ram (19) is able to operate properly to expel the product. Accordingly, said ram (19) may be of a shape and size matching those of the bore of the pack (1) or, if the cap (3) of said pack is of a certain rigidity, it may be undersized.

The rack (18) moves vertically through a ring gear (21) which meshes with it and is operated manually by a lever (22) whose pivot pin traverses the housing (23) laterally so that the lever (22) is exterior to it and, therefore, fully accessible.

The machine is designed so that when the product has been dispensed, the rack (18) and more specifically the ram (19) revert automatically to an upper limit, a return spring

(24) being fitted between said rack (18) and the housing (17) against which the lever (22) is pivoted as the pack (1) is emptied.

The pack (1) may comprise a single serving, so that all the contents (2) pass to the collecting receptacle (20) in a single operation; or else said pack (1) may hold several servings for distribution of the contents to various receptacles (20), in which case the holder (15) should be height-adjustable so as to bring the position of the support (4') and, therefore, of the pack itself (1) into line with the stroke requirements of the rack (18).

In any case, according to the object of the invention, the ice-cream product (2) made and marketed in plastic, cardboard or similar packs (1) may be consumed by the user in more attractive receptacles, such as a plate, a cup or any other glass, ceramic or similar item. Said pack (1) comprises a cartridge which, as has been mentioned above, has a sliding cap or plunger (3) which moves with the ram (19), and a mouth or nozzle (7) which is initially sealed and can easily be opened, for example by using a thin disc (11) heat-welded to the outlet of said mouth or nozzle.

What is claimed is:

1. An ice-cream container pack that forms a replaceable cartridge in an associated dispensing machine, said pack comprising a cylindrical body fitted with a nozzle and a plunger which, when operated by a piston of said machine, dispenses the ice cream from the pack via said nozzle, wherein said pack presents a bottom edge (8) of a cylindrical body wall (1) directly attached to an end wall (5), said end wall being in the form of a truncated cone, a smaller and free base of which houses the extrusion nozzle (7), whereby a part of the end wall (5) constitutes a support base for the pack on a support (4') with which said dispensing machine is provided.

2. An ice-cream container pack according to claim 1, wherein the pack is sealed at a bottom end, during storage and transportation of said pack, by means of a disc (11) of shape and size appropriate to the smaller free base of the truncated cone end-wall (5) where the nozzle (7) is situated, so that said disc (11) is attached directly to the part of the pack corresponding to said extrusion nozzle (7), said disc being readily removeable to facilitate dispensing of the ice cream.

3. An ice-cream container pack according to claim 1, wherein overhanging portions (12) of a base or central sector (6) of the truncated cone wall (5) defining the extrusion nozzle are minimally deformable by the forces delivered from the machine's piston to the plunger (3) of the pack during dispensing.

4. An ice-cream container pack according to claim 1 wherein the pack is substantially rigid.

5. An ice-cream container pack according to claim 1 wherein the pack is made of polypropylene.

6. A machine for the extrusion dispensing of an ice-cream product contained in a pack designed to transfer the ice-cream product (2) from said pack (1) to a consumption receptacle (20), said machine comprising a frame (4) equipped with means to allow the machine to stand on a horizontal platform or to be wall mounted, said frame bearing a holder (15) for the ice-cream container pack (1) and a means for driving a ram (19) which operates the plunger in said pack in order to extrude the ice cream product, wherein the pack is a pack according to claim 1 and holder (15) comprises a support (4') on which the truncated conical end wall of said pack is directly seated.

7. A machine according to claim 6, in which the support (4' for the ice-cream pack (1) is provided with inner radial mounts (10), said mounts having surfaces at an angle that matches that of the truncated cone end-wall (5) of the pack (1), thereby providing direct support to said end-wall.

8. A machine according to claim 6 in which means are provided for heating the support (4' or heating radial mounts attached to said support (10), on which the truncated cone wall (5) of the pack is seated during dispensing, thereby providing local warming of the ice cream in the vicinity of the extrusion nozzle (7) and improving the fluidity of the product as it is extruded.

9. A machine according to claim 6, in which the means for driving the ram (19) comprises a rack (18) that terminates in said ram, said rack moving vertically within a housing (17), said housing being attached to the frame (4).

10. A machine according to claim 9, in which the rack (18) is driven by a manually-operated lever (22) via a ring gear (21).

11. A machine according to claim 6, wherein the frame (4) is fitted with a stand or base (13) to support the machine on a counter, said stand or base being attached to said frame by means of a coupling (14), enabling said stand (13) to be removed when the machine is intended for wall mounting.

12. A machine according to claim 6, wherein the holder (15) for the pack (1) terminates at the end opposite to that where it is attached to the frame in a bushing, comprising a support (4') with a vertical axis, fitted with an internal perimeter stop (16), for stable coupling to the aforesaid pack (1), also arranged vertically, so that the sliding plunger cap (3) of said pack (1) faces the ram (19) of the rack (18), while the bottom outlet or nozzle (7) in the pack (1) is in turn over the receptacle (20) where the ice-cream is to be served.

13. A machine according to claim 6, wherein the holder (15) for the ice-cream pack (1) is mounted on a frame and can be height-adjusted to adapt the relative positions of said pack (1) and the ram (19) of the rack (18) to packs (1) of differing axial dimension and containing either one or several ice-cream servings.

14. A machine according to claim 6, wherein the ram (19) reverts automatically to an upper limit position, to which end the rack (18) is connected to the housing (17) by way of a return spring (24), against which the rack (18) moves when the lever (22) is operated.

* * * * *